United States Patent 3,028,411
Patented Apr. 3, 1962

3,028,411
PREPARATION OF ORGANIC MONOBORATE SALTS
Don L. Hunter, Long Beach, Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed Dec. 9, 1959, Ser. No. 858,311
4 Claims. (Cl. 260—462)

This invention relates as indicated to a method for making organic monoborate salts and has particular reference to the preparation of the alkali metal salts of glycol monoborates.

Sodium and potassium salts of various glycol monoborates have been known to those skilled in the art for a long time. However, these materials have found little or no use in industry due to the fact that methods for obtaining the salts in substantially pure form have been costly, inefficient and difficult. Consequently, the salts of glycol monoborates have not been exploited and their valuable properties have gone unknown to industry.

We have found that the alkali metal salts of glycol monoborates have unique solubilities and other properties which make them particularly desirable as additives in a number of organic media. For instance, these salts impart alkalinity and are effective as anti-corrosion agents in lubricating greases. We have found that the salts of the glycol monoborates when added to lubricating oils act as anti-sludging agents. The salts of the glycol monoborates when added to paints, varnishes and lacquers that have organic solvents as the vehicle increase the flame resistance of said paints, varnishes and lacquers. When the glycol monoborate salts are dissolved in an organic solvent they can be used to impregnate wood and fiberboard and act as a flame retardant. When added to siloxane resins the salts of the glycol monoborates act as dehydrating and curing agents and impart the property of coating articles with the siloxane resin with a minimum of run-off and without changing the thermal stability, dielectrical properties and flexibility of the resins.

It is therefore the principal object of this invention to provide a method for making the alkali metal salts of glycol monoborates, which method is economically desirable and provides good yields of substantially pure salts.

It is a further object of this invention to provide compositions of lubricating oils and greases, paints, lacquers and varnishes, and siloxane resins with the alkali metal salts of glycol monoborates.

Other objects of the invention will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

Broadly stated, the present invention comprises the method of making the alkali metal salts of glycol monoborates which comprises reacting an alkali metal hydroxide with a diglycol boric anhydride, said di-glycol boric anhydride having the general formula:

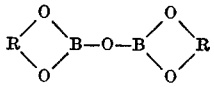

where R is an alkylene radical of from 2 to 3 carbon atoms in length and containing from 2 to 10 carbon atoms.

While in the following example only di-(2-methylpentanediol-2,4)boric anhydride is used for illustrative purposes, it will be clearly understood that it is only necessary to merely substitute in its stead any of the other defined diglycol boric anhydrides to achieve comparable results. It is to be clearly understood that in the specification and claims the term "glycol" refers to all diols and in the present specification we are concerned with the 1,2 and 1,3-diols.

Thus the following materials are typical examples of the 1,2 and 1,3-glycol boric anhydrides applicable to the present process:

Di-(propanediol-1,2)boric anhydride
Di-(butanediol-1,2)boric anhydride
Di-(butanediol-1,3)boric anhydride
Di-(2,2,4-trimethylpentanediol-1,3)boric anhydride
Di-(pentanediol-2,3)boric anhydride
Di-(2,3,4-trimethylpentanediol-2,4)boric anhydride
Di-(catechol)boric anhydride
Di-(2-methylpentanediol-2,4)boric anhydride As for the other reactant used in the present process, any of the alkali metal hydroxides, e.g., Na, Li, K, Cs, and Rb hydroxides are equally applicable.

It is of interest to note at this time that the alkaline earth metal hydroxides have been used to produce the metal glycol monoborates of the present invention. However, due to the fact that they are relatively insoluble in the reaction mixture, the reaction times were so extremely long and the yields so small as to make such process economically undesirable. Nevertheless, the fact remains that such reactions did occur.

I

In to a two-liter, three-necked, round-bottomed flask equipped with a paddle-type stirrer, a water condenser, and a pot thermometer, were added 270 grams of di-(2-methylpentanediol-2,4)boric anhydride and 500 mls. of methanol; 80 grams of sodium hydroxide was then added to the liquid mixture. When the initial exothermic reaction subsided, heat was applied and the reaction mixture was refluxed for about one-half hour. The methanol and water of reaction were stripped from the flask and the residue, sodium 2-methylpentanediol-2,4 monoborate, was then removed and vacuum dried for about 2 to 4 hours. Chemical analysis of the resultant sodium 2-methylpentanediol-2,4 monoborate revealed the following data:

Na=13.76% (theory 13.86%)
B=6.44% (theory 6.52%)

Essentially the same procedure was followed in experiments using the other alkali metal hydroxides. Using lithium hydroxide, the final product of the reaction was lithium 2-methylpentanediol-2,4 monoborate whose chemical analysis revealed the following data:

Li=4.61% (theory 4.68%)
B=7.12% (theory 7.22%)

Using potassium hydroxide, the final product was potassium 2-methylpentanediol-2,4 monoborate whose chemical analysis revealed the following data:

K=21.18% (theory 21.47%)
B=5.85% (theory 5.94%)

It will also be noted that substantially identical results were obtained with the other di-(glycol)boric anhydrides previously enumerated.

The alkali metal glycol monoborates, as stated previously, have found particular utility in various organic compositions; for example, when added to lubricating oils in amounts from about 0.1 to about 3% by weight they act as an excellent anti-sludging agent, and when added in amounts from about 0.1% to about 3% to lubricating oils and greases they act as an anti-corrosion agent. It is generally accepted by those skilled in the art that metal salts of organic compounds are substantially insoluble in organic solvents. The present alkali metal glycol monoborates, however, show remarkable solubilities in many organic solvents. For example, when sodium 2-methylpentanediol-2,4 monoborate is added in amounts of from about 0.5 to about 10% to oil base paints, lacquers and varnishes, which contain common commercial solvents, all the sodium 2-methylpentanediol-2,4 monoborate dissolves and imparts the property of flame resistance to the various paints, lacquers and varnishes. Sodium 2-methylpentanediol-2,4 monoborate when dissolved in an organic solvent such as hexane in amounts from about 0.2 to about 10% can be used to impregnate wood and fiberboard for increased fire retardance.

A very serious condition that has long plagued the silicone resin industry has been the large amount of runoff of a silicone resin from a coated article while the resin was curing. The electrical industry has long been dipping electric coils and other articles into a solution of silicone resins, air drying and then curing the material in an oven. The run-off at times has been over 50% of the resin and when the resins gels in the bottom of the curing oven it is of course of no further value. We have found that additions of from about 0.1 to about 4% of one of the present alkali metal salts of glycol monoborate to many of the silicone resin solutions has lowered the run-off to less than about 20% with no curing catalyst added.

Even more outstanding results are obtained when from about 0.1 to about 4% of sodium 2-methylpentanediol-2,4 monoborate is added as a dehydrating agent to a silicone resin which contains as little as 0.05% of one of the well-known silicone curing catalysts, such as zinc hexoate, zinc octoate, lead butyrate or cobalt naphthenate. In this instance the run-off is substantially eliminated.

Other modes of applying the principle of the invention may be employed provided the features stated in any of the following claims or the equivalent of such be employed.

We, therefore, particularly point out and claim as our invention:

1. The method of making the alkali metal salts of glycol monoborates which comprises reacting an alkali metal hydroxide with a di-glycol boric anhydride, said di-glycol boric anhydride having the general formula:

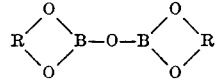

where R is an alkylene radical of from 2 to 3 carbon atoms in length and containing from 2 to 10 carbon atoms.

2. The method of making sodium 2-methylpentanediol-2,4 monoborate which comprises reacting sodium hydroxide and di-(2-methylpentanediol-2,4)boric anhydride in alcohol and recovering the resultant sodium 2-methylpentanediol-2,4 monoborate.

3. The method of making potassium 2-methylpentanediol-2,4 monoborate which comprises reacting potassium hydroxide and di-(2-methylpentanediol-2,4)boric anhydride in alcohol and recovering the resultant potassium 2-methylpentanediol-2,4 monoborate.

4. The method of making lithium 2-methylpentanediol-2,4 monoborate which comprises reacting in alcohol lithium hydroxide and di-(methylpentanediol-2,4)boric anhydride and recovering the resultant lithium 2-methylpentanediol-2,4 monoborate.

References Cited in the file of this patent
UNITED STATES PATENTS

| | | |
|---|---|---|
| 2,598,402 | Lucas | May 27, 1952 |
| 2,689,843 | Ludington | Sept. 21, 1954 |
| 2,754,217 | Allen et al. | July 10, 1956 |
| 2,852,466 | Hotten | Sept. 16, 1958 |
| 2,883,412 | Lowe | Apr. 21, 1959 |
| 2,902,450 | Lowe | Sept. 1, 1959 |
| 2,904,578 | Brust | Sept. 15, 1959 |
| 2,933,402 | Harrington et al. | Apr. 19, 1960 |
| 2,934,556 | Hoffman et al. | Apr. 26, 1960 |